United States Patent
Bhat et al.

(10) Patent No.: US 7,203,747 B2
(45) Date of Patent: Apr. 10, 2007

(54) LOAD BALANCING SYSTEM AND METHOD IN A MULTIPROCESSOR SYSTEM

(75) Inventors: Prashanth B. Bhat, Foster City, CA (US); Andrei Broder, Menlo Park, CA (US); Richard A. Kasperski, Canyon (CA)

(73) Assignee: Overture Services Inc., Pasadena, CA (US)

(*) Notice: Subject to any disclaimer, the term of this patent is extended or adjusted under 35 U.S.C. 154(b) by 619 days.

(21) Appl. No.: 09/865,988

(22) Filed: May 25, 2001

(65) Prior Publication Data

US 2003/0037093 A1 Feb. 20, 2003

(51) Int. Cl.
*G06F 9/50* (2006.01)

(52) U.S. Cl. .............. 709/224; 709/223; 718/104; 718/105; 707/5

(58) Field of Classification Search ........ 709/200–253; 707/1–10, 100–104.1, 200–206; 718/1, 100–108
See application file for complete search history.

(56) References Cited

U.S. PATENT DOCUMENTS

| | | | | |
|---|---|---|---|---|
| 5,644,720 A | * | 7/1997 | Boll et al. | 709/227 |
| 5,978,577 A | * | 11/1999 | Rierden et al. | 707/10 |
| 5,991,808 A | * | 11/1999 | Broder et al. | 709/226 |
| 6,006,264 A | * | 12/1999 | Colby et al. | 709/226 |
| 6,070,191 A | * | 5/2000 | Narendran et al. | 709/226 |
| 6,078,960 A | * | 6/2000 | Ballard | 709/229 |
| 6,138,159 A | * | 10/2000 | Phaal | 709/226 |
| 6,148,003 A | * | 11/2000 | Van Dort | 370/462 |
| 6,173,322 B1 | * | 1/2001 | Hu | 709/224 |
| 6,175,869 B1 | * | 1/2001 | Ahuja et al. | 709/226 |
| 6,185,619 B1 | * | 2/2001 | Joffe et al. | 709/229 |
| 6,279,001 B1 | * | 8/2001 | DeBettencourt et al. | 707/10 |
| 6,324,580 B1 | * | 11/2001 | Jindal et al. | 709/228 |
| 6,353,847 B1 | * | 3/2002 | Maruyama et al. | 718/105 |
| 6,377,975 B1 | * | 4/2002 | Florman | 709/203 |
| 6,389,448 B1 | * | 5/2002 | Primak et al. | 718/105 |
| 6,546,454 B1 | * | 4/2003 | Levy et al. | 711/6 |
| 6,928,482 B1 | * | 8/2005 | Ben Nun et al. | 709/235 |

OTHER PUBLICATIONS

Cao, Zhiruo, et al. "Performance of Hashing-Based Schemes for Internet Load Balancing." IEEE. Mar. 2000.*

* cited by examiner

*Primary Examiner*—Lewis A. Bullock, Jr.
(74) *Attorney, Agent, or Firm*—Dreier LLP

(57) ABSTRACT

A system and method are disclosed for selecting a resource, among a plurality of resources, for servicing a request. To select a resource to service the request, a first resource is randomly selected. If a first load value associated with the first resource does not exceed a threshold value, the request is assigned to the first resource for servicing. Otherwise a second resource is randomly selected. If a second load value associated with the second resource does not exceed a threshold value, the request is assigned to the second resource for servicing. If the second load value exceeds the threshold value, the request is assigned whichever of the first and second resources has a lower load value.

39 Claims, 5 Drawing Sheets

| Processor identifier | Load value | Load capacity value | Unavailable data |
|---|---|---|---|
| 1 | 3 | 250 | |
| 2 | 2 | 800 | |
| 3 | 4 | 350 | |
| 4 | 1 | 400 | |
| 5 | 6 | 100 | |
| 6 | 9 | 300 | |
| ⋮ | | | |
| N | | | |

Total load capacity value: 12, 500

Fig. 3A

| Processor identifier | Load value | Load capacity value | Unavailable data |
|---|---|---|---|
| 1 | 3 | 250 | |
| 2 | 2 | 800 | |
| 3 | 4 | 350 | |
| 4 | 1 | 400 | √ |
| 5 | 6 | 100 | √ |
| 6 | 9 | 300 | |
| ⋮ | | | |
| N | | | |

Total load capacity value: 12, 000

FIG. 3B

LOAD BALANCING SYSTEM AND METHOD IN A MULTIPROCESSOR SYSTEM

The present invention relates generally to multiprocessor systems and particularly to a method of balancing query loads in a multiprocessor system.

BACKGROUND OF THE INVENTION

Multiprocessor systems which service a multitude of requests (e.g., queries) from a large number of users must use their resources efficiently in order to service the requests without undue delay. This is especially true for web servers which receive queries for service from multiple users simultaneously. Queries from users may be for a particular web page or for a set of search results, in the case where the server is a web crawler server. If there is undue delay in servicing the requests, the users may discontinue use of the web server.

In a multiprocessor system, load balancing is required to distribute received queries among a plurality of processors to allow efficient servicing of the queries or other requests. If some processors are heavily loaded with queries while other processors are lightly loaded or remain unused for periods of time, the average time required to service a query can rise considerably.

Prior load balancers known in the art have managed distribution of requests or queries in a round robin basis or have directed requests to the processor with the lowest load for servicing. The round robin method, however, does not take into account possible variations in processor load capacity or processing power among the plurality of processors in the system. Therefore, over time, processors with a lower load capacity would be heavily loaded while processors with a higher load capacity would be lightly loaded or remain unused for periods of time.

The method of directing requests for service to the processor with the lowest load also has a drawback in that once the processor with the lowest load is identified, it will draw the most traffic, an effect known as herding.

Another method of request distribution is to randomly select a set of processors and assign the request to the processor in this set with lowest associated load for servicing. However, this approach does not take into account that there may be a preferred choice of processors and this method can expend valuable resources by querying and comparing load values of several processors. See for example U.S. Pat. No. 5,991,808.

Various load balancing methods have been used in multiprocessor systems. However, there remains a need for a simple and efficient method for balancing the load distributions of a multiprocessor system which does not unduly expend valuable system resources.

SUMMARY OF THE INVENTION

The present invention includes a method for choosing a resource, among a plurality of resources, for servicing a request, such as query. In accordance with the present invention a first resource is randomly selected among the plurality of resources in accordance with a predefined first random selection function. Each of the resources has an associated load value. The load value of the first resource is compared to a threshold value, and upon determining that the first load value does not exceed the threshold value, the request is assigned to the first resource for servicing the request.

In another aspect of the method of the present invention, when it is determined that the first load value exceeds the predetermined threshold value, a second resource is randomly selected among the plurality of resources in accordance with a predefined second random selection function. The load value of the second resource is compared to the threshold value, and upon determining that the second load value does not exceed the threshold value, the request is assigned to the second resource for servicing the request.

In yet another aspect of the method of the present invention, when it is determined that the second load value exceeds the predetermined threshold value, the first and second load values are compared and the request is assigned to one of the first resource and second resource having a lower associated load value for servicing the request.

In a preferred embodiment, the resources to which queries are allocated are processors, one of whose functions is to process queries.

The present invention also includes a system for selecting a resource, among a plurality of resources, for servicing a request. The system includes one or more interfaces for receiving a request and for forwarding the request to a selected resource and control logic. The control logic is configured to randomly select a first resource among the plurality of resources in accordance with a predefined first random selection function, the first resource having an associated first load value, compare the first load value to a predetermined threshold value to determine whether the first load value exceeds the predetermined threshold value, and assign the request to the first resource for servicing the request when the first load value does not exceed the predetermined threshold value. The control logic, in some embodiments, is implemented as one or more processing units for executing stored procedures, and a set of request allocation procedures stored in memory within the system.

BRIEF DESCRIPTION OF THE DRAWINGS

Additional objects and features of the invention will be more readily apparent from the following detailed description and appended claims when taken in conjunction with the drawings, in which:

FIGS. 3A and 3B depicts two examples of the data contained in the processor data table shown in FIG. 2.

DESCRIPTION OF THE PREFERRED EMBODIMENTS

Query Handling System—General Architecture

Figure 1:
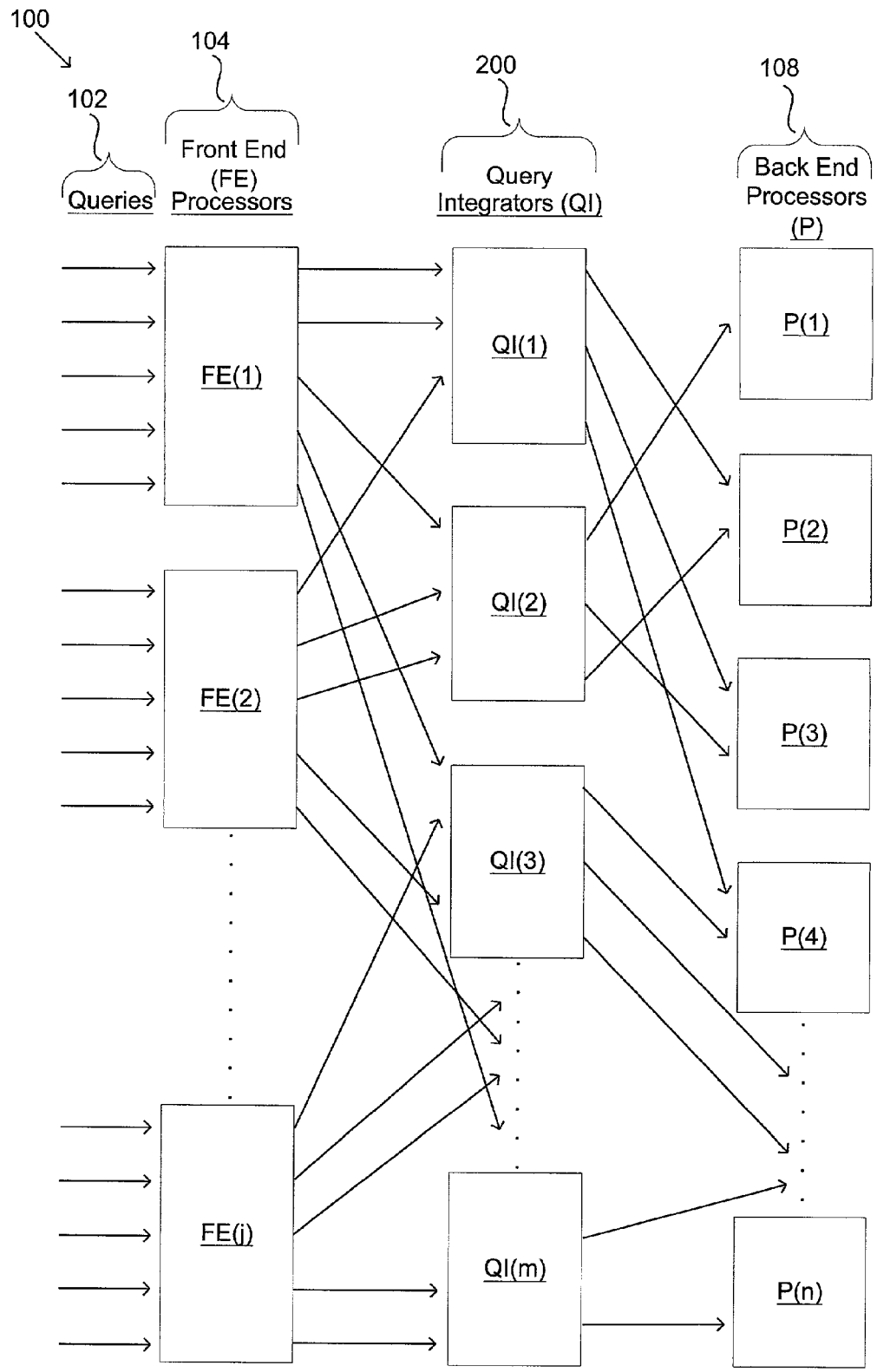
FIG. 1 is a block diagram of a multiprocessor system environment.

Referring to FIG. 1, the environment of a multiple processor system 100 is shown to include a plurality of front end processors FE(1) to FE(j) 104, a plurality of query integrators QI(1) to QI(m) 200, and a plurality of back end processors P(1) to P(n) 108. Queries 102 are initially received by the front end processors 104. Each front end processor 104 operates separately and independently of the other front end processors 104. Similarly, each query integrator 200 operates separately and independently of the other query integrators 200. Additionally, each of the back end processors 108 operate separately and independently of each other. The multiprocessor system 100 may be a either a homogeneous system in which each of the processors have substantially similar load capacity values or processor speeds, or a heterogeneous system in which the processors have different load capacity values or processor speeds.

The queries 102 are sent from multiple users to the front end processors 104, which randomly direct each individual query 102 to a single query integrator 200 among the plurality of query integrators. The queries may be randomly assigned to the query integrators, or may be assigned in round robin fashion by each front end processor or in any other manner that reasonably distributes the computational load associated with query allocation among the back end processors. Upon receiving a query, each query integrator randomly or pseudo randomly directs the query to one of the back end processors 108 to service or execute the query. Each query integrator uses a random processor assignment procedure of the present invention to randomly assign a query to a back end processor 108.

Query Integrator

The job of the query integrators 200 is to distribute queries among the back end processors so as to balance the computational load among the back end processors. The query integrators randomly assign queries among the processors in a manner that is weighted in accordance with both the load handling capabilities and the actual computational loads of the back end processors.

Figure 2:
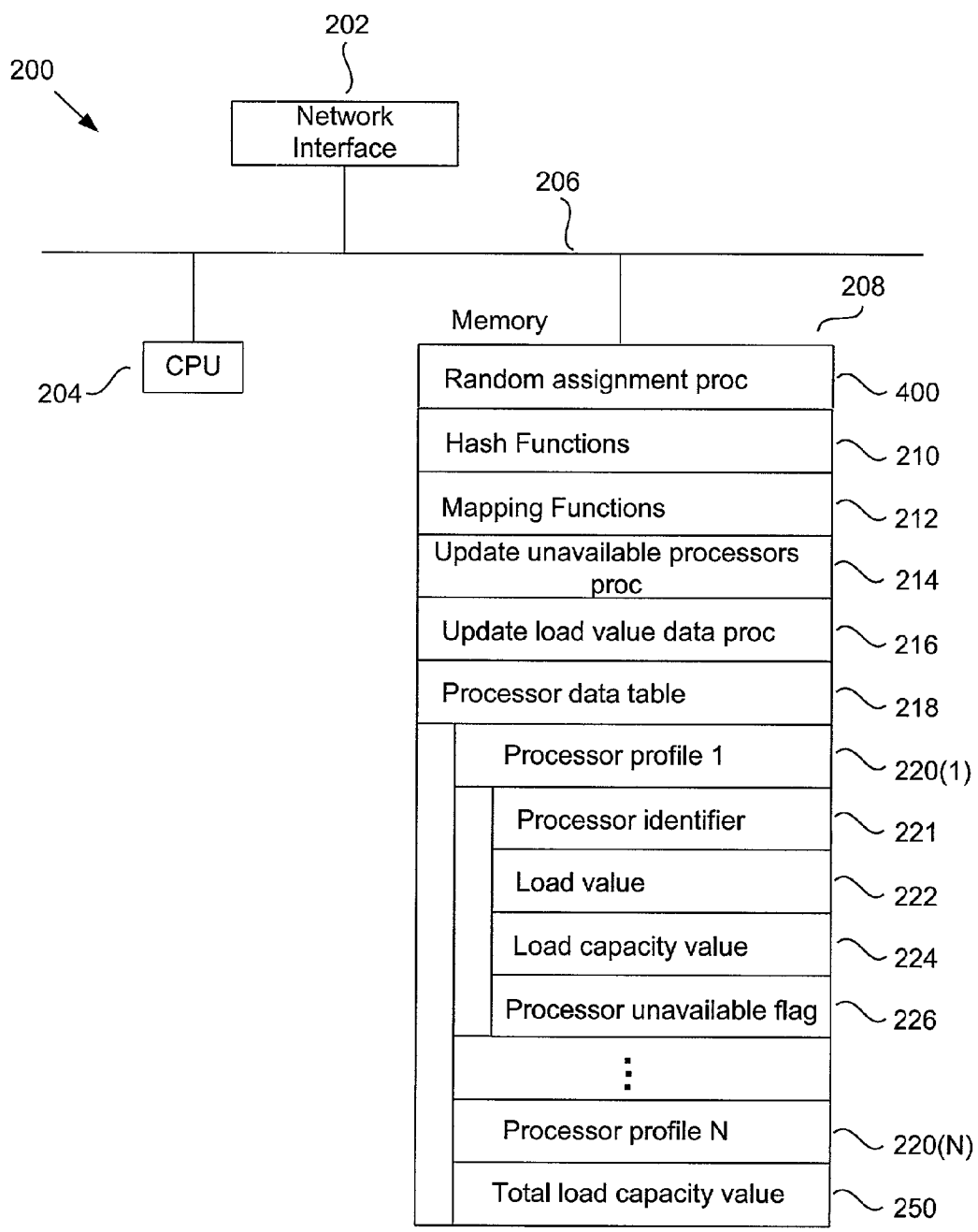
FIG. 2 is a block diagram of the query integrator shown in FIG. 1.

Referring to FIG. 2, each query integrator 200 includes a network interface 202, a central processing unit (CPU) 204, a memory 208, and an interconnecting bus 206. Queries are received from the front end processors 104 via the network interface 202, and the queries are also forwarded for processing to the back end processors 108 via the network interface 202. In another embodiment, different communication interfaces are used for receiving and forwarding the queries.

The memory 208 stores procedures and data structures including a random processor assignment procedure 400, a set of hash functions 210, a set of mapping functions 212, an update unavailable processors procedure 214, an update load value data procedure 216, and a processor data table 218. The processor data table 218 contains a plurality of processor profiles 220(1) to 220(N). Each processor profile 220(1) to 220(N) contains a processor identifier 221 and information regarding the processor corresponding to the processor identifier. This information preferably includes a load value 222, a load capacity value 224, and a processor unavailable flag or indicator 226. The processor data table 218 also includes a total load capacity value 250 which is calculated by summing the load capacity values 224 in the processor data table 218. More specifically, the total load capacity value 250 is the sum of the load capacity values 224 of the processors, excluding the processors that are marked as being unavailable.

In an alternate embodiment, the CPU 204 and procedures executed by the CPU to randomly or pseudo randomly direct queries to the back end processors are performed by control logic that is implemented in whole or in part using hardwired logic circuitry. From another viewpoint, the query integrator's CPU and the procedures it executed to assign queries to back end processors comprise a set of control logic.

Processor Data Table Fields. Within each profile 220, the processor identifier 221 uniquely identifies a particular processor. The load value 222 of a processor is based on how long a query must wait before it can be serviced by the processor, i.e., the latency period of a processor. Each query integrator 200 automatically updates the load value data for each processor at predetermined intervals using the update load value data procedure 216 (described below). The load capacity value 224 of a processor is based on the processor's processing speed or power. The processors unavailable flag 226 indicates whether or not the processor is unavailable, i.e., not in service, and is incapable of servicing any queries.

Overview of Query Integrator Procedures

The random processor assignment procedure 400 uses the data described above from the processor data table 218 and integrates the hash functions 210, the mapping functions 212, the update unavailable processors procedure 214, the update load value data procedure 216, and other procedures (as described below in FIG. 4) to randomly assign a processor to a received query for servicing the query.

The set of hash functions 210 contained in memory 208 include three or four distinct hash functions that are used in different situations to randomly select a processor (as described below). Generally, a hash function generates a hash value or hash number from a string of text in such a way that it is extremely unlikely that two different strings of text produce identical hash values. In the present invention, hash functions are used produce a hash value R which is a fixed length numeric representation of the received query text: R=HashFunction(query). Many suitable hash functions are known to those skilled in the art, including checksum functions and fingerprint functions, and thus are not described here. In an alternate embodiment, only one hash function is used.

The set of mapping functions 212 contained in memory 208 include separate and distinct mapping functions which are used in different situations to map the hash values produced by the hash functions 210 to a processor (as described below). In a preferred embodiment, the mapping functions apply a modulo function to determine a mapping value X which is then mapped to a selected processor. In the preferred embodiment, the mapping function takes into consideration the load capacity value of each processor, which weights the processor's probability of selection. Therefore, the selection of processors by the mapping functions is pseudo random since selection is weighted by the capacity of the processor giving a processor with a higher capability a greater probability of being selected.

The update unavailable processors procedure 214 contained in memory 208 may be called by any of the query integrators 200 when a randomly selected processor is determined to be unavailable. When the update unavailable processors procedure 214 is called, each processor is queried to determine whether the processor is available or unavailable. The unavailable flags 226 for each processor in the processor data table 218 is then updated to reflect the new data regarding the availability or unavailability of each processor. A new total load capacity value 250 is then calculated by summing the load capacity values 224 of all processors excluding any unavailable processors. In a preferred embodiment, the update unavailable processors procedure 214 is also executed in the background at predetermined intervals, for example, every 200 ms.

Table 1 contains a pseudo-code representation of the update unavailable processors procedure 214. The pseudo-code used in Tables 1–5 uses universal computer language conventions. While the pseudo-code employed here has been invented solely for the purposes of this description, it is designed to be easily understandable by any computer programmer skilled in the art.

TABLE 1

Update Unavailable Processors Procedure

```
update unavailable processors ( ) {
    query processors for availability;
    update processor unavailable flags in the processor data table;
    calculate new total load capacity value {
        sum the load capacities of all available processors;
    };
    update total load capacity value in the processor data table;
};
End;
```

The update load value data procedure 216 contained in memory 208 is used to update load values 222 at predetermined intervals, for example, every 2 ms. The update load value data procedure 216 queries each processor for its current load value and updates the load value 222 in the processor data table 218 for each processor profile 220(1) to 220(N). The update load value data procedure 216 is performed by the query integrator 200 automatically and is repeated indefinitely.

Table 2 contains a pseudo-code representation of the update load value data procedure 216.

TABLE 2

Update Load Data Procedure

```
update load value ( ) {
    repeat indefinitely {
        do:
            wait (T). /* perform update every T ms */
            query processors for current load values;
            update load values in the processor data table;
        };
    };
End;
```

Processor Data Table Examples

FIGS. 3A and 3B show two examples of the data contained in the processor data table (218 of FIG. 2). FIG. 3A depicts exemplary data contained in the processor data table (218 of FIG. 2) when no processors are determined to be unavailable. FIG. 3B depicts the exemplary data shown in FIG. 3A after two processors have been found to be unavailable and the update unavailable processors procedure (214 of FIG. 2) has been called. Thus, the total load capacity value 250 (FIG. 2) is the sum of the load capacity values 224 of the processors, excluding the processors that are marked as being unavailable.

As described above, the "load value" fields in the processor data table represent a processing latency for each processor while the load capacity value for each processor represents the total processing power of the processor.

Random Processor Assignment Procedure

Figure 4:
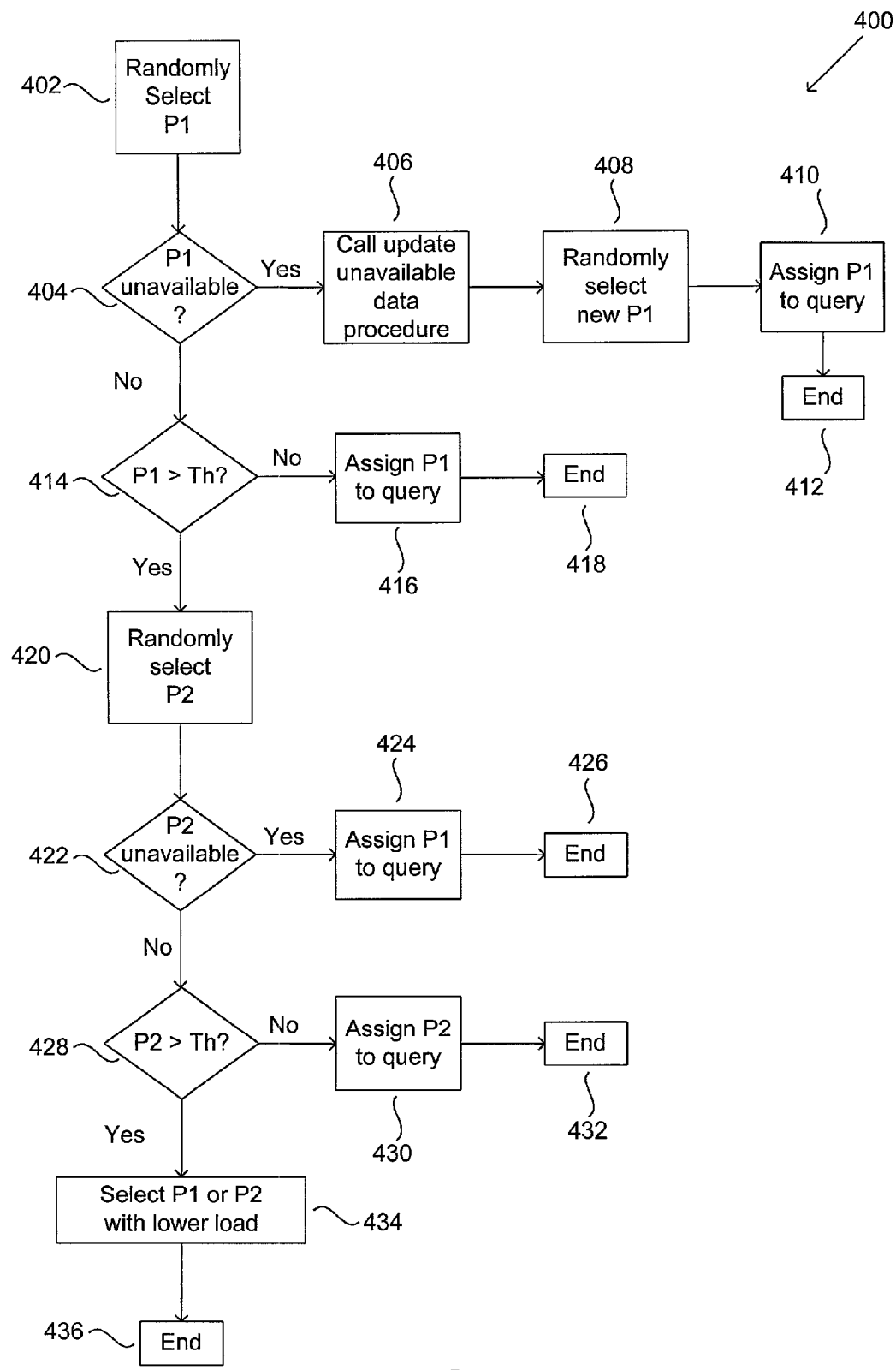
FIG. 4 is a flow chart showing a random processor assignment procedure in accordance with the present invention.

Referring to FIG. 4, a flow chart for the random processor assignment procedure (400 of FIG. 2) is shown in accordance with the present invention. The random processor assignment procedure 400 is used by the query integrator (200 of FIG. 1) to randomly assign each received query a back end processor to service the query. After the query integrator receives a query from a front end processor (104 of FIG. 1), the query integrator randomly selects a first selected processor P1 using a first hash function and a first mapping function at step 402.

A pseudo-code representation of step 402 is shown in Table 3. The query integrator applies a first hash function HashFunction1 to the query to obtain a hash value R1. The query integrator then applies a first mapping function MF1 on hash value R1 to map R1 to a processor P1. More specifically, the mapping function applies a modulo function on the hash value to derive a mapping value X1 using the total load capacity value (TC) of the plurality of resources as the modulus value: X1=R1 modulo TC. Therefore, the obtained mapping value X1 is between the values 0 and the total load capacity value minus 1. The mapping value X1 is then mapped to a processor among the plurality of processors. The preferred method of such a mapping is to sum the load capacities of the processors starting from the first processor until the sum exceeds the mapping value X1, and then selecting the processor which corresponds to the last load capacity that was summed. This method, in effect, assigns a range of mapping values to each processor and then determines the processor whose range includes X1.

In an alternate embodiment, a range of mapping values could be computed in advance and assigned to each processor, for instance by storing the mapping range in the processor data table, and then searching the table for the processor whose range includes X1.

Therefore, the selection of the processor P1 is pseudo random since the selection is weighted by the capacities of the processors, giving a processor with a higher capability a greater probability of being selected. By doing so, the method of query load balancing of the present invention takes into account that there may be a preferred choice of processors. The advantage of such an approach is that processors with greater capability are more likely to be selected, thereby increasing system performance since the more powerful processors will execute the queries faster with a reduced latency period.

TABLE 3

Randomly Select Processor P1 - Step 402

```
R1 = HashFunction1(Query)
/* Apply Mapping function: */
X1 = R1 modulo TC;  /* apply a modulo function to the hash value R1
    with the total load capacity value as the modulus to obtain a mapping
    value X1 which is between 0 and (TC-1) */
/* P1 = Map (X1, processor data table): */
    Y = 0;              /* set a summing variable to 0 */
    P = 0;              /* set a processor identifier variable to 0 */
    Do until Y > X1 {
        P = P + 1; /* select the next processor identifier */
        Skip unavailable processors, and adjust P as necessary;
        Y = Y + capacity (P); /* sum the load capacity of the processors */
    };
    P1 = P; /* the first selected processor P1 is the processor
        corresponding to the last load capacity summed */
```

Next, at step 404 the query integrator checks the first selected processor P1 to determine if the processor is available or unavailable. If the first selected processor P1 is determined to be unavailable, the query integrator calls the update unavailable processors procedure (214 of FIG. 2), at step 406, to update the processor unavailable flag (226 of FIG. 2) for each processor and to obtain a new total load capacity value (250 of FIG. 2) which excludes the load capacities of the unavailable processors. A pseudo-code representation of the update unavailable processors procedure is shown in Table 1.

At step 408, the query integrator then randomly selects a new processor P1 using a second hash function and the first mapping function.

A pseudo-code representation of step 408 is shown in Table 4. The query integrator applies a second hash function HashFunction2 to the query to obtain a hash value R2. The second hash function HashFunction2 may be the same hash function as HashFunction1 or may be a different hash function.

The query integrator then applies the first mapping function MF1 on hash value R2 to map R2 to a new processor P1. More specifically, the mapping function applies a modulo function on the hash value to derive a mapping value X2: X2=R2 modulo TC. Therefore, the obtained mapping value X2 is between the values 0 and the total load capacity value TC minus 1. The mapping value X2 is then mapped to a processor among the plurality of available processors. The preferred method of such a mapping is to sum the load capacities of the available processors, starting from the first available processor until the sum exceeds the mapping value X2, and then selecting the processor which corresponds to the last load capacity that was summed. This method, in effect, assigns a range of mapping values to each available processor and then determines the processor whose range includes X2.

TABLE 4

Randomly Select New Processor P1 (New P1) - Step 408

```
R2 = HashFunction2(Query)
/* Apply Mapping function: */
X2 = R2 modulo TC; /* apply a modulo function to the hash value R2
    with the total load capacity value as the modulus to obtain a mapping
    value X2 which is between 0 and (TC-1) */
/* P1 = Map (X2, processor data table): */
    Y = 0;          /* set a summing variable to 0 */
    P = 0;          /* set a processor identifier variable to 0 */
    Do until Y > X2 {
        P = P + 1;  /* select the next processor identifier */
        Skip unavailable processors, and adjust P as necessary;
        Y = Y + capacity (P); /* sum the load capacity of the processors */
    };
    P1 = P;         /* the selected processor P1 is the processor
                       corresponding to the last load capacity summed */
```

At step 410, the newly selected processor P1 is assigned to service the query. The random processor assignment procedure 400 then ends at step 412 and the next received query begins processing at step 402.

If the first selected processor P1 is determined to be available, at step 404, the query integrator then compares the first selected processor's load value to a predetermined threshold value at step 414. If the query integrator determines (step 414-No) that the first selected processor's load value is not greater than the predetermined threshold value, the query integrator assigns the query to the first selected processor P1 at step 416 and the random processor assignment procedure 400 ends at step 418. Otherwise (step 414-Yes), if the query integrator determines that the load value of the first selected processor is greater than the predetermined threshold value, the query integrator applies a third hash function and a second mapping function to the query to randomly select a second processor P2 at step 420.

The third hash function can be the same as the hash function used in step 408, since steps 408 and 420 are mutually exclusive in this embodiment. However, the third hash function should be different from the first hash function used to select processor P1 in step 402. A third hash function, different from the first hash function, is used to hash the query text to improve the chances that the second selected processor will be randomly selected with respect to the first selected processor. Alternately, a different seed value can be used with the first hash function so that the first hash function, when applied to the query text, produces a random value that is not correlated with the first selected processor. For the purposes of this document, when a hash function is used with a new seed value, that will be considered to be a different hash function. A "seed value" in this context is conceptually similar to concatenating a seed string to the beginning of the query text that is to be processed by the hash function.

The second mapping function excludes the first selected processor P1 from the set of processors that can be selected.

A pseudo-code representation of step 420 is shown in Table 5. The query integrator applies the third hash function HashFunction3 to the query to obtain a hash value R3. The query integrator then applies a second mapping function MF2 on hash value R3 to map R3 to a processor P2. More specifically, the mapping function applies a modulo function on the hash value to derive a mapping value X2 using an adjusted total load capacity value (TC2) of the plurality of resources, excluding processor PI, as the modulus value: X2=R3 modulo TC2. Therefore, the obtained mapping value X2 is between the values 0 and the adjusted total load capacity value TC2 minus 1. The mapping value X2 is then mapped to a processor among the plurality of processors, excluding processor P1. The preferred method of such a mapping is to sum the load capacities of the processors, excluding processor P1, starting from the first processor until the sum exceeds the mapping value X2, and then selecting the processor which corresponds to the last load capacity that was summed. This method, in effect, assigns a range of mapping values to each processor and then determines the processor whose range includes X2.

TABLE 5

Randomly Select Processor P2 - Step 420

```
R3 = HashFunction3(Query)
/* Apply Mapping function: */
TC2 = TC - capacity(P1) /* total load capacity excluding load capacity
    of P1 */
X2 = R3 modulo TC2; /* apply a modulo function to the hash value R3
    with the adjusted total load capacity value as the modulus to obtain a
    mapping value X2 which is between 0 and (TC2-1) */
/* P2 = Map2 (X2, P1, processor data table): */
    Y = 0;          /* set a summing variable to 0 */
    P = 0;          /* set a processor identifier variable to 0 */
Do until Y > X2 {
    P = P + 1;      /* select the next processor identifier */
    Skip unavailable processors, and adjust P as necessary;
    If P=P1 {P=P+1}  /* skip processor P1 */
    Y = Y + capacity (P); /* sum the load capacity of the processors */
};
P2 = P;       /* the selected processor P2 is the processor
                 corresponding to the last load capacity summed */
```

Next, at step 422 the query integrator checks the second selected processor P2 to determine if the processor is available or unavailable. If the first selected processor P2 is determined to be unavailable, the query integrator assigns the previously selected processor P1 to handle the query at step 424, and then the random processor assignment procedure 400 ends at step 426.

If the second processor P2 is available (step 422-No), the query integrator then compares the second selected processor's load value, called the second load value, to the predetermined threshold value at step 428. If the query integrator determines that the second load value is not greater than the predetermined threshold value, the query integrator assigns the query to the second selected processor P2 for service at step 430 and the random processor assignment procedure 400 ends at step 432. If the query integrator determines that the second load value is greater than the predetermined threshold value, the query integrator assigns the query to the first or second selected processor, whichever has the lower associated load value, for servicing at step 434. The random processor assignment procedure 400 then ends at step 436.

In an alternate embodiment, when the first selected processor is not available (step 404-yes), the query is then assigned by selecting the next available processor in the processor data table, moving through the table in a predefined direction until an available processor is found. However, this method may overload a processor adjacent (in the processor data table) to a unavailable processor since it would receive all of the load from the unavailable processor.

To reduce the computational resources used by the query integrators to assign queries to back end processors, the predetermined load threshold used in steps 414 and 428 may be set to a high value, which will increase the chance of a query being assigned to the first selected processor and avoiding steps 420 through 436 of the random assignment procedure. Except when the first selected back end processor is heavily loaded, the hash function and mapping functions will not be executed to select a second processor. On the other hand, to improve load balancing among the back end processors it may be preferred to set the predetermined load threshold to a lower value, which increases the chances of each query being assigned to a lightly loaded back end processor.

Alternate Embodiment of Random Assignment Procedure

Figure 5:
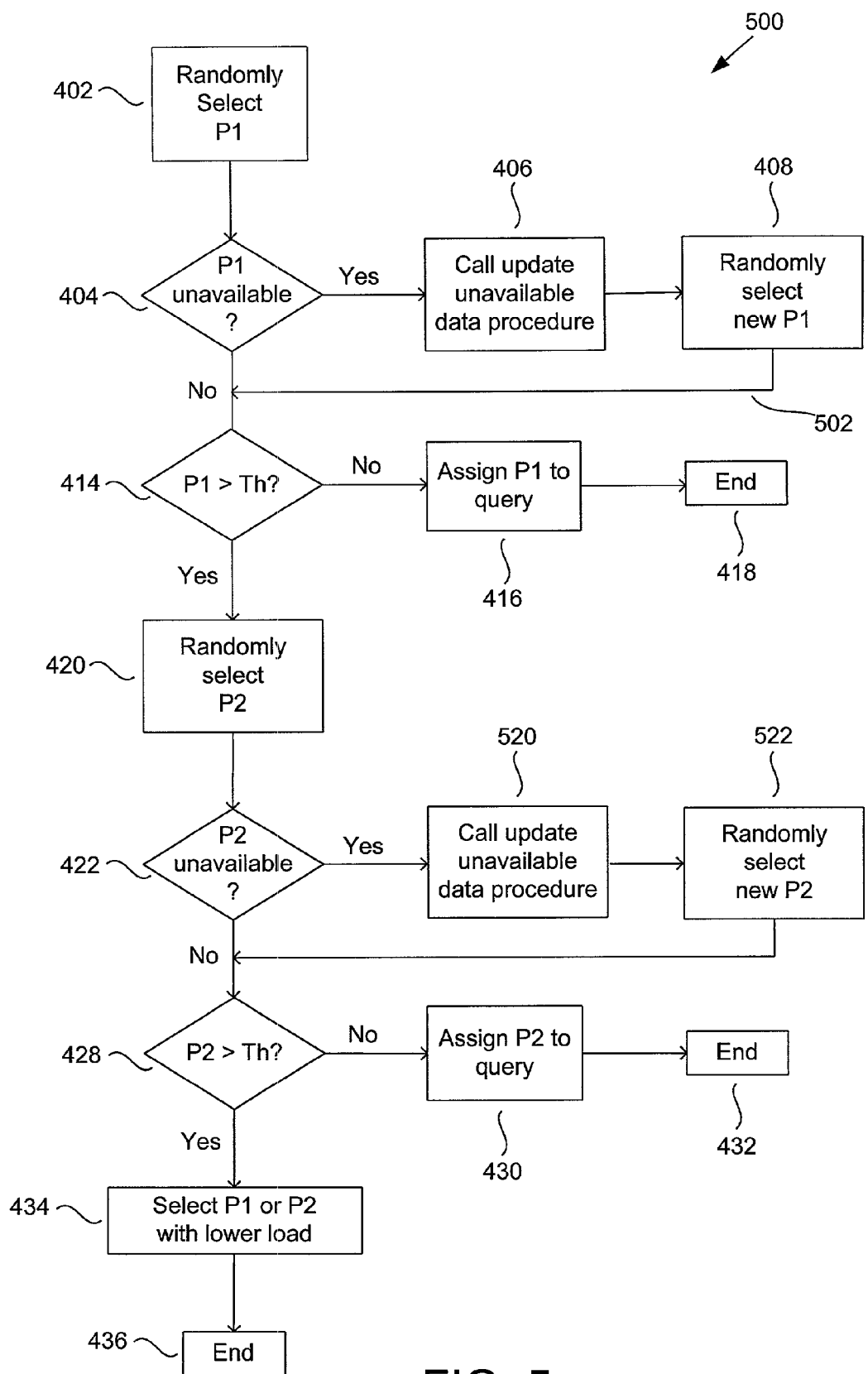
FIG. 5 is a flow chart showing an alternative embodiment of the random processor assignment procedure in accordance with the present invention.

An alternate embodiment 500 of the random assignment procedure is shown in FIG. 5. Only the aspects of this embodiment which differ from the embodiment shown in FIG. 4 will be described.

In this embodiment, if the first selected processor is unavailable (step 404-yes) and a new first processor P1 has been selected (step 408), the procedure does not exit at this point. Instead, the procedure continues at step 414, via program control path 502. Thus, the load of the new processor P1 will be compared with the threshold and a new processor P2 will be randomly selected (step 420) if the load of the new processor P1 is greater than the threshold (step 414-yes).

A second difference is that if the second selected processor is unavailable (step 422-yes), the update unavailable processors procedure (214 of FIG. 2) is called in step 520, and then a new processor P2 is selected in step 522. The procedure for selecting the new processor P2 is the same as the one for step 420 and is represented in pseudo-code form in Table 5. The hashing function used in step 522 may be the same hashing function as the one used in step 420, or it may be a different one. However, in general, the hashing function used in step 522 should be different from the one used in steps 402 and 408.

After step 522, the procedure continues at step 428. Thus, the load of the new processor P2 will be compared with the threshold and the query will be assigned to the first or second selected processor having the lower associated load value (step 434) if the load of the new processor P2 is greater than the threshold (step 428-yes).

Alternate Embodiment of the Mapping Functions

In the preferred embodiment described above, the mapping functions apply a modulo function to determine a mapping value X which is then mapped to a selected processor. An example of a preferred method of such a mapping is to sum the load capacities of the processors starting from the first processor until the sum exceeds the mapping value X, and then selecting the processor which corresponds to the last load capacity that was summed. This method, in effect, assigns a range of mapping values to each processor and then determines the processor whose range includes X.

In an alternate embodiment, a range of mapping values could be computed in advance and assigned to each processor, for instance by storing the mapping range in the processor data table, and then searching the table for the processor whose range includes X.

Both of these embodiments of the mapping function uses a probability density function to map a randomly selected X to a processor P. The selection probability for each available processor corresponds to its load capacity, and these load capacities are mapped into a probability density function by the processor data table and the mapping function that reads the processor data table to select a processor. A mathematical description of the probability density function is as follows.

$$TC = \sum_{i=1}^{N} \text{capacity}(P_i)$$

where the index i is used only to identify available processors and N is the number of available processors. The "capacity($P_i$)" represents the selection probability of a processor i. TC is the total of the selection probabilities.

The mapping is therefore obtained by solving for the smallest value of S to satisfy the following equation:

$$\sum_{i=1}^{S} \text{capacity}(P_i) \geq X$$

where X is a randomly selected value between 0 and TC−1.

The present invention can be used for load balancing in a variety of multiprocessor systems, including system handling requests other than queries. The present invention can be implemented as a computer program product that includes a computer program mechanism embedded in a computer readable storage medium. For instance, the computer program product could contain the program modules shown in FIG. 2. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method for choosing a resource for processing a search query on the world wide web, among a plurality of resources, comprising:

randomly selecting a first resource among the plurality of resources in accordance with a predefined first random selection function, the first resource having an associated first load value;

performing a first comparison between the first load value and a predetermined threshold value to determine whether the first load value exceeds the predetermined threshold value;

executing said search query by said first resource when said first comparison returns false; and randomly selecting a second different resource with a second load value among the plurality of resources in accordance with a predefined second random selection function when said first comparison returns true, wherein said first random selection function is different from said second random selection function.

2. The method of claim 1, further comprising:

performing a second comparison between said second load value and said predetermined threshold value to determine whether the second load value exceeds the predetermined threshold value;

assigning the search query to said second different resource for servicing the search query when said second comparison result returns false.

3. The method of claim 2, further comprising:

comparing the first load value to the second load value and assigning the search query to one of the first resource and second resource having a lower associated load value for servicing the search query when said second comparison result return true.

4. The method of claim 2, wherein the randomly selecting a second resource is performed by applying a one-way hashing function to the search query to generate a first intermediate value, applying a modulo function to the intermediate value to generate a second intermediate value; and applying a mapping function for mapping the second intermediate value so as to select the second resource from among the plurality of resources.

5. The method of claim 4, wherein the modulo function applied has a modulus whose value corresponds to a total load handling capacity of the plurality of resources excluding the first resource.

6. The method of claim 5, wherein each of the resources of the plurality of resources has an associated respective load handling capacity; and the mapping function is a probability density function in which each resource in the plurality of resources, excluding the first resource, has a mapping range whose size corresponds to the respective load handling capacity associated with the resource.

7. The method of claim 5, wherein each of the resources of the plurality of resources has an associated respective load handling capacity; and the mapping function is a weighted mapping function that is weighted in accordance with the respective load handling capacities associated with the plurality of resources excluding the first resource.

8. The method of claim 1, further comprising:

determining whether the first resource is unavailable for selection;

upon determining that the first resource is unavailable for selection, determining which of the plurality of resources are available for selection and redefining the plurality of resources to include only those of the plurality of resources that are available for selection, and then randomly selecting a resource from among the redefined plurality of resources.

9. The method of claim 1, wherein the randomly selecting is performed by applying a one-way hashing function to the search query to generate a first intermediate value, applying a modulo function to the intermediate value to generate a second intermediate value; and applying a mapping function for mapping the second intermediate value so as to select the first resource from among the plurality of resources.

10. The method of claim 9, wherein the modulo function applied has a modulus whose value corresponds to a total load capacity of the plurality of resources.

11. The method of claim 9, wherein each of the resources of the plurality of resources has an associated respective load capacity; and the mapping function is a probability density function in which each resource in the plurality of resources has a mapping range whose size corresponds to the respective load capacity associated with the resource.

12. The method of claim 9, wherein each of the resources of the plurality of resources has an associated respective load capacity; and the mapping function is a weighted mapping function that is weighted in accordance with the respective load capacities associated with the plurality of resources.

13. A system for selecting a resource for processing a search query on the world wide web, among a plurality of resources, comprising:

one or more interfaces for receiving a search query and for forwarding the search query to a selected resource;

one or more processing units for executing stored procedures;

memory for storing the procedures executed by the one or more processing units, the procedures including:

instructions for randomly selecting a first resource among the plurality of resources in accordance with a predefined first random selection function, the first resource having an associated first load value;

first comparing instructions for comparing the first load value to a predetermined threshold value to determine whether the first load value exceeds the predetermined threshold value;

instructions for assigning the search query to the first resource for servicing the search query by said first resource when execution of the first comparing instructions determines that the first load value does not exceed the predetermined threshold value; and instructions for randomly selecting a second different resource with a second load value among the plurality of resources in accordance with a predefined second random selection function when said first load value exceeds the predetermined threshold value, wherein said first random selection function is different from said second random selection function.

14. The system of claim 13, further comprising:

second comparing instructions for comparing the second load value to the predetermined threshold value to determine whether the second load value exceeds the predetermined threshold value; and instructions for assigning the search query to the second different resource for servicing the search query when execution of the second comparing instructions determines that the second load value does not exceed the predetermined threshold value.

15. The system of claim 14, including additional instructions whose execution by the one or more processing units is invoked when the second comparing instructions determine that the second load value exceeds the predetermined threshold value, the additional instructions including:
instructions for comparing the first load value to the second load value and assigning the search query to one of the first resource and second resource having a lower associated load value for servicing the search query.

16. The system of claim 14, wherein the instructions for randomly selecting a second resource include instructions for applying a one-way hashing function to the search query to generate a first intermediate value, applying a modulo function to the intermediate value to generate a second intermediate value, and applying a mapping function for mapping the second intermediate value so as to select the second resource from among the plurality of resources.

17. The system of claim 16, wherein the modulo function applied has a modulus whose value corresponds to a total load handling capacity of the plurality of resources excluding the first resource.

18. The system of claim 17, wherein each of the resources of the plurality of resources has an associated respective load handling capacity; and the mapping function is a probability density function in which each resource in the plurality of resources, excluding the first resource, has a mapping range whose size corresponds to the respective load handling capacity associated with the resource.

19. The system of claim 17, wherein each of the resources of the plurality of resources has an associated respective load handling capacity; and the mapping function is a weighted mapping function that is weighted in accordance with the respective load handling capacities associated with the plurality of resources excluding the first resource.

20. The system of claim 13, including additional instructions for: determining whether the first resource is unavailable for selection; upon determining that the first resource is unavailable for selection, determining which of the plurality of resources are available for selection and redefining the plurality of resources to include only those of the plurality of resources that are available for selection, and then randomly selecting a resource from among the redefined plurality of resources.

21. The system of claim 13, wherein the instructions for randomly selecting a first resource include instructions for applying a one-way hashing function to the search query to generate a first intermediate value, applying a modulo function to the intermediate value to generate a second intermediate value, and applying a mapping function for mapping the second intermediate value so as to select the first resource from among the plurality of resources.

22. The system of claim 21, wherein the modulo function applied has a modulus whose value corresponds to a total load capacity of the plurality of resources.

23. The system of claim 21, wherein each of the resources of the plurality of resources has an associated respective load capacity; and the mapping function is a probability density function in which each resource in the plurality of resources has a mapping range whose size corresponds to the respective load capacity associated with the resource.

24. The system of claim 21, wherein each of the resources of the plurality of resources has an associated respective load capacity; and the mapping function is a weighted mapping function that is weighted in accordance with the respective load capacities associated with the plurality of resources.

25. A system for selecting a resource for processing a search query on the world wide web, among a plurality of resources, comprising:
one or more interfaces for receiving the search query and for forwarding the search query to a selected resource;
control logic configured to randomly select a first resource among the plurality of resources in accordance with a predefined first random selection function, the first resource having an associated first load value;
performing a first comparison of the first load value to a predetermined threshold value to determine whether the first load value exceeds the predetermined threshold value;
assign the search query to the first resource for servicing the search query by the first resource when the first load value does not exceed the predetermined threshold value; and
control logic further configured to randomly selecting a second different resource with a second load value among the plurality of resources in accordance with a predefined second random selection function when the first load value exceeds the predetermined threshold value, wherein said first random selection function is different from said second random selection function.

26. The system of claim 25, further comprising:
performing a second comparison between said second load value and said predetermined threshold value to determine whether said second load value exceeds the predetermined threshold value; and
assigning the search query to the second resource for servicing the search query when it is determined that the second load value does not exceed the predetermined threshold value.

27. The system of claim 26, wherein the control logic is further configured to assign the search query to whichever of the first and second resources has a lower associated load value when the second load value exceeds the predetermined threshold value.

28. A computer program product for use in conjunction with a computer system having one or more interfaces for receiving a search query and for forwarding the search query to a selected resource for processing the search query on the world wide web, the computer program product comprising a computer readable storage medium and a computer program mechanism embedded therein, the computer program mechanism comprising:
instructions for randomly selecting a first resource among the plurality of resources in accordance with a predefined first random selection function, the first resource having an associated first load value;
first comparing instructions for comparing the first load value to a predetermined threshold value to determine whether the first load value exceeds the predetermined threshold value; and
instructions for assigning the search query to the first resource for servicing the search query by the first resource when execution of the first comparing instructions determines that the first load value does not exceed the predetermined threshold value; and
instructions for randomly selecting a second different resource with a second load value among the plurality of resources in accordance with a predefined second random selection function when the first load value exceeds the predetermined threshold value, wherein said first random selection function is different from said second random selection function.

29. The computer program product of claim 28, further comprising:
   second comparing instructions for comparing the second load value to the predetermined threshold value to determine whether the second load value exceeds the predetermined threshold value; and
   instructions for assigning the search query to the second resource for servicing the search query when execution of the second comparing instructions determines that the second load value does not exceed the predetermined threshold value.

30. The computer program product of claim 29, including additional instructions whose execution by the one or more processing units is invoked when the second comparing instructions determine that the second load value exceeds the predetermined threshold value, the additional instructions including:
   instructions for comparing the first load value to the second load value and assigning the search query to one of the first resource and second resource having a lower associated load value for servicing the search query.

31. The computer program product of claim 29, wherein the instructions for randomly selecting a second resource include instructions for applying a one-way hashing function to the search query to generate a first intermediate value, applying a modulo function to the intermediate value to generate a second intermediate value, and applying a mapping function for mapping the second intermediate value so as to select the second resource from among the plurality of resources.

32. The computer program product of claim 31, wherein the modulo function applied has a modulus whose value corresponds to a total load handling capacity of the plurality of resources excluding the first resource.

33. The computer program product of claim 32, wherein each of the resources of the plurality of resources has an associated respective load handling capacity; and the mapping function is a probability density function in which each resource in the plurality of resources, excluding the first resource, has a mapping range whose size corresponds to the respective load handling capacity associated with the resource.

34. The computer program product of claim 32, wherein each of the resources of the plurality of resources has an associated respective load handling capacity; and the mapping function is a weighted mapping function that is weighted in accordance with the respective load handling capacities associated with the plurality of resources excluding the first resource.

35. The computer program product of claim 28, including additional instructions for: determining whether the first resource is unavailable for selection; upon determining that the first resource is unavailable for selection, determining which of the plurality of resources are available for selection and redefining the plurality of resources to include only those of the plurality of resources that are available for selection, and then randomly selecting a resource from among the redefined plurality of resources.

36. The computer program product of claim 28, wherein the instructions for randomly selecting a first resource include instructions for applying a one-way hashing function to the search query to generate a first intermediate, value, applying a modulo function to the intermediate value to generate a second intermediate value, and applying a mapping function for mapping the second intermediate value so as to select the first resource from among the plurality of resources.

37. The computer program product of claim 36, wherein the modulo function applied has a modulus whose value corresponds to a total load capacity of the plurality of resources.

38. The computer program product of claim 36, wherein each of the resources of the plurality of resources has an associated respective load capacity; and the mapping function is a probability density function in which each resource in the plurality of resources has a mapping range whose size corresponds to the respective load capacity associated with the resource.

39. The computer program product of claim 36, wherein each of the resources of the plurality of resources has an associated respective load capacity; and the mapping function is a weighted mapping function that is weighted in accordance with the respective load capacities associated with the plurality of resources.

* * * * *